United States Patent [19]
Rebold

[11] Patent Number: 6,066,834
[45] Date of Patent: May 23, 2000

[54] SPEED CONTROL DEVICE FOR DC MOTORS

[75] Inventor: Jerome I. Rebold, Baltimore, Md.

[73] Assignee: Ready Welder Co., San Fedro, Calif.

[21] Appl. No.: 09/053,577

[22] Filed: Apr. 3, 1998

Related U.S. Application Data

[60] Provisional application No. 60/042,617, Apr. 3, 1997.

[51] Int. Cl.$^7$ ...................................................... B23K 9/12
[52] U.S. Cl. ...................................... 219/137.71; 388/937
[58] Field of Search ........................... 219/137.71, 137.2, 219/137.7, 137.31, 125.1, 132; 388/804, 811, 814, 819, 829, 831, 937

[56] References Cited

U.S. PATENT DOCUMENTS

| | | | |
|---|---|---|---|
| 4,703,156 | 10/1987 | Hayes | 219/137.31 |
| 4,851,743 | 7/1989 | Schmerda et al. | 388/811 |
| 5,086,208 | 2/1992 | Habermann | 219/137.71 |
| 5,289,560 | 2/1994 | Abney | 388/811 |
| 5,609,782 | 3/1997 | Kim | 219/132 |
| 5,889,922 | 3/1999 | Bufe et al. | 388/804 |

*Primary Examiner*—Clifford C. Shaw
*Attorney, Agent, or Firm*—Sughrue, Mion, Zinn, Macpeak & Seas, PLLC

[57] ABSTRACT

A speed control device is provided such that the speed of DC motors is controlled to remain constant with varying voltages supplied from a power source. A given application for such a speed control device is in the use of portable, hand-held Metal Inert Gas (MIG) welders. The power requirements of a portable MIG welder are twofold. Power is required for the generation of a welding current to enable the workpieces to be sufficiently heated and thus, welded together, and power is also required to drive a wire spooler which provides wire at a constant rate, leading to accurate and consistent welds. The speed control device provided ensures constant power delivery for both power requirements, regardless of variations in the voltage of a power supply and irrespective of a mechanical load asserted on the welder.

13 Claims, 5 Drawing Sheets

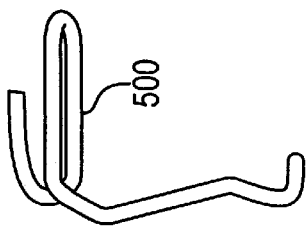
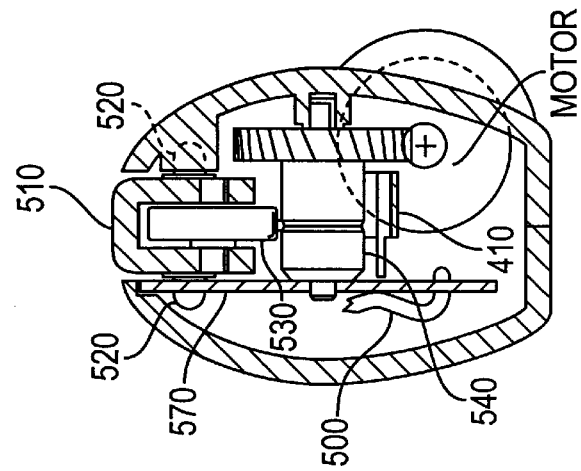
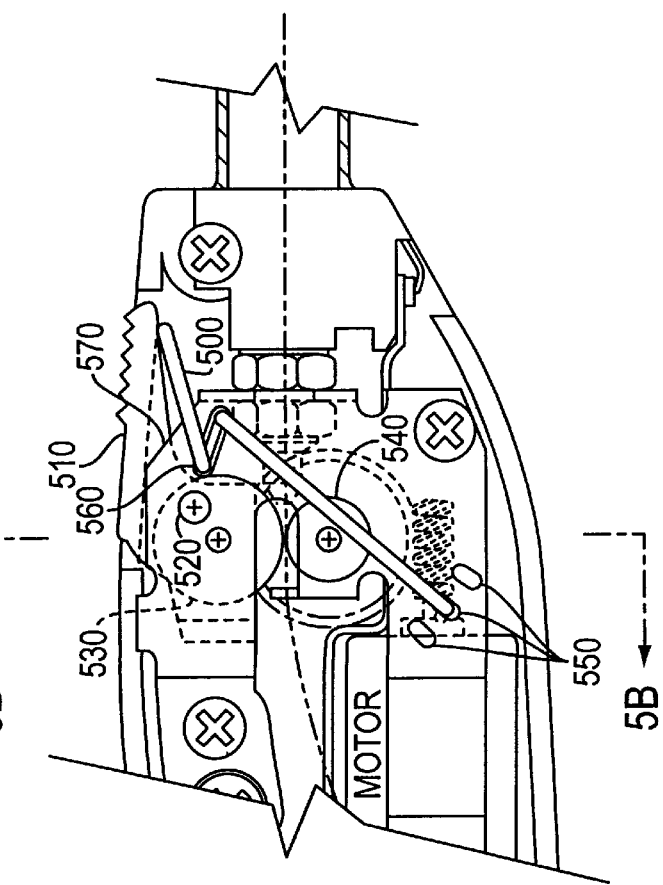

SPEED CONTROL DEVICE FOR DC MOTORS

CROSS REFERENCE TO RELATED APPLICATIONS

This application is an application filed under 35 U.S.C. § 111(a) claiming benefit pursuant to 35 U.S.C. § 119(e)(1) of the filing date of the Provisional Application No. 60/042,617 filed on Apr. 3, 1997 pursuant to 35 U.S.C. § 111(b).

BACKGROUND OF THE INVENTION

1. Field of the Invention

The subject invention relates to a speed control device for controlling the rotational speed of DC electrical motors.

2. Description of the Related Art

For a given applied voltage, and presuming no mechanical load, electrical DC motors generally rotate at a relatively constant speed. However, many practical applications require control of the rotational speed of the work shaft which is rotated by the motor. Therefore, various methods have been developed to vary the rotational speed of a work shaft rotated by the motor. Examples of such methods are reduction gears or belts. However, such mechanical systems generally; require much space, generate noise, and are susceptible to mechanical failures. Accordingly, various ways to control the rotational speed of the motor shaft itself have also been developed. For example, one known method for controlling the speed of an electrical motor is pulse width modulation (PWM). While PWM can provide accurate control of the speed of the motor, it requires relatively elaborate circuitry, generally including one or two timers. Therefore, it is not particularly suitable for low cost applications.

In attempting to control the speed of a DC motor one encounters two problems. First, the speed of the motor tends to change during its operation depending on the mechanical load imposed on the work shaft. For example, the speed at which the shaft rotates on a portable drill changes depending on the pressure applied to the drill by the user of the drill. A second problem is that the speed of the motor also changes depending on the voltage level of the battery used to energize the motor.

These two problems are particularly difficult to solve when one attempts to design a low cost apparatus using the motor. However, in certain low cost applications, accurate control of the motor is very beneficial. One example of such a low cost application is a portable metal inert gas (MIG) arc welder. With respect to MIG welders there is a need to control the speed with which the thin wire electrode is delivered. Accurate control of the wire delivery speed enables one to make accurate welds for work pieces of various thickness. Moreover, once the appropriate speed has been established, the user typically expects the motor to maintain a constant speed for the duration of the welding process, irrespective of the battery voltage level. Furthermore, once the appropriate speed has been set, the user expects the motor to rotate at the set speed at all future welding sessions, regardless of whether a different battery is used at the future welding sessions. For example, a user may have a shop power source set-up which is fully charged and a field power source set-up which has been partially discharged. It would be very beneficial if, for a given speed set-up, the wire delivery rate would be the same for the shop and the field power source set-ups.

In addition to the above noted problems, another problem which is common to MIG welders is that the arc welding process causes sudden supply voltage changes and interference within the welder. For precise electrode delivery speed control, the speed control circuit for a MIG welder must be able to overcome these sudden changes and interference.

Therefore, some welding systems use separate and independent power systems for the creation of the arc and for the electrode delivery. Such a system is disclosed in, for example, U.S. Pat. Nos. 4,801,780 and 4,703,156, both to Hayes. These patents disclose a configuration wherein the welder power supply generates the arc, while a conventional hand-held drill drives a gear mechanism which delivers the electrode.

Another speed control MIG welder is disclosed in U.S. Pat. No. 5,086,208 to Habermann. This patent discloses a variable resistor in conjunction with a diode bridge for controlling the speed of the motor. However, the variable resistor system suffers from changes in the speed of the motor as the battery voltage drops during a welding session. The variable resistor system further suffers from speed inconsistencies when different power source set-ups are used.

SUMMARY OF THE INVENTION

To overcome the above-mentioned problems with conventional DC motors it is an object of the present invention to provide a speed control circuit for DC motors.

It is another object of the present invention to provide a speed control circuit for DC motors which maintains the speed of the motor irrespective of the mechanical load placed on the motor.

It is another object of the present invention to provide a speed control circuit for DC motors which controls the speed of the motor irrespective of battery voltage drops.

Yet another object of the present invention is to provide a speed control circuit for DC motors which, for a given speed set-up, will drive the motor at the same speed regardless of the power source voltage.

It is another object of the present invention to provide a speed control circuit for DC motors, which can withstand sudden changes in the power supply.

It is another object of the present invention to provide a speed control circuit for DC motors, which is suitable for use in a portable MIG welder.

To achieve these and other advantages and objectives, the present invention provides a design whereby an electronic circuit is used to control the rotational speed of a low-cost DC motor.

According to the present invention, relatively inexpensive speed control circuitry is provided for controlling the speed of DC motors. More specifically, the inventive circuitry uses a Zener diode to establish a constant operating voltage for the speed control circuitry.

The operating voltage of the inventive circuitry is immune to drops in the battery voltage and maintains a constant value irrespective of the power source voltage.

The speed control circuitry uses an N-type MOSFET as a switching element providing power to the motor. The switching of the MOSFET is controlled by a comparator, which in turn, outputs high/low signals depending on the charge on a capacitor. The capacitor is configured in an "hour glass" fashion to flip the output of the comparator between "high" condition and a "low" condition. During the "motor on" time, the capacitor is charged to one polarity from the power source and during the "motor off" time the capacitor is charged to the opposite polarity from the back electro-motive force (emf) of the motor.

BRIEF DESCRIPTION OF THE DRAWINGS

Other objects and advantages of the present invention will become apparent from the following description of the preferred embodiment with reference to the drawings, in which:

FIGS. 5A, 5B, and 5C are cut-away views of a portion of a portable MIG welder suitable for use with the present invention providing a close-up of a spring device used for stabilizing and feeding the electrode according to an embodiment of the present invention.

DETAILED DESCRIPTION OF THE PREFERRED EMBODIMENT

Figure 1:
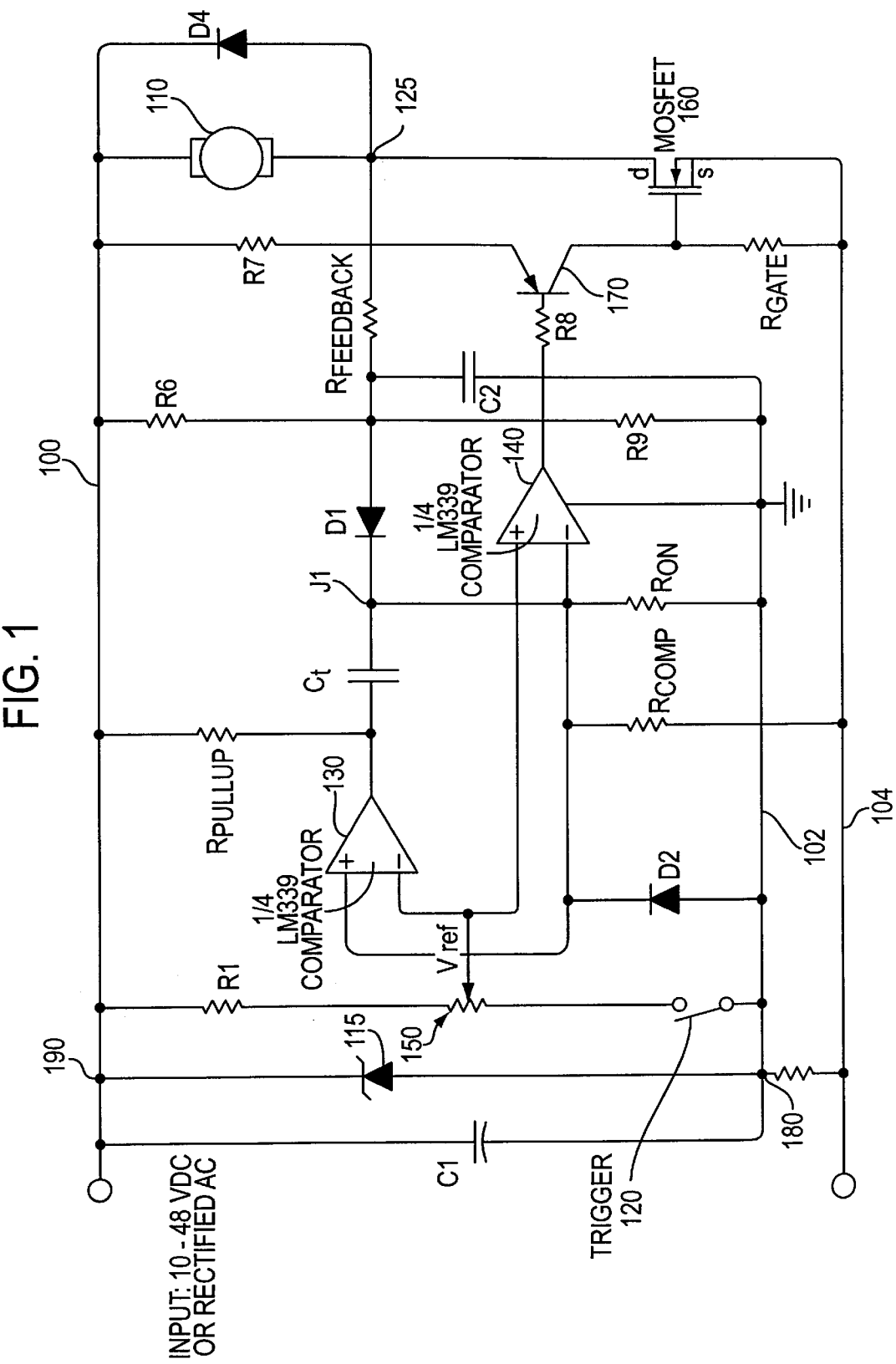
FIG. 1 is an electronic schematic of the speed control circuit according to a preferred embodiment of the present invention.

FIG. 1 depicts an exemplary embodiment of the speed control circuit according to the invention. An advantageous feature of the speed control circuit of FIG. 1 is that it drives the motor at a constant speed regardless of the mechanical load imposed on the motor. This allows the use of a relatively inexpensive motor while giving the user the feel of an expensive powerful motor. That is, since the speed of the motor does not change with the mechanical load, the user gets the impression that the motor is powerful enough to overcome the mechanical load.

Another advantageous feature of the speed control circuit of FIG. 1 is that it drives the motor at a constant speed, irrespective of battery voltage drops. Yet another advantageous feature of the speed control circuit of FIG. 1 is that, given a speed set-up, it drives the motor at a constant speed, irrespective of the voltage of the power source. Certain other specific features will be explained below while others will be apparent from the disclosure taken as a whole.

The embodiment of FIG. 1 is used to control the rotational speed of a DC motor 110. This exemplary embodiment operates irrespective of sudden supply voltage changes, such as those encountered in MIG welders. The operational voltage of this particular embodiment is 10–48 VDC or full-wave rectified AC.

In the following description, line 100 is referred to as the positive rail, line 102 as the ground rail, and line 104 as the negative rail. In the preferred embodiment, the potential between the positive rail and the ground rail is maintained at 6 volts by the Zener diode 115, regardless of the voltage of the power source. The potential between the positive rail and the negative rail depends on the voltage of the power source.

The motor 110 is connected between the positive and negative rails, via the switching MOSFET 160. Diode D4 is connected in parallel to the motor to account for the inductance of the motor when the current to the motor is turned off by the switching MOSFET 160.

The gate of MOSFET 160 is connected to an inverter which, in this embodiment, comprises resistor R8 and transistor 170, in conjunction with resistor R7. It should be noted, however, that the use of the inverter in this embodiment was made only to enable the use of an N-type MOSFET (rather than the more expensive P-type MOSFET) with the particular configuration of comparators 130 and 140. Those skilled in the art would recognize that the inverter can be omitted if a P-type switching MOSFET is used, or if another arrangement of the comparators 130 and 140 is provided.

The general operation of the embodiment of FIG. 1 will be described hereinafter. When the trigger switch 120 is closed, the level of $V_{ref}$ drops to a level below the potential which exists between the positive and ground rails. The actual voltage would depend on the set-up of the variable resistor 150, i.e., speed setting. This will cause comparator 130 to output a high level and comparator 140 to output a low level. The low output of the comparator 140 is then inverted by transistor 170, which turns switching MOSFET 160 on. Thus, the motor is energized.

Concurrently, capacitor Ct begins to discharge towards $V_{ref}$. Since diode D1 is blocking discharge of the capacitor (because motor 110 is at a lower voltage than ground potential), capacitor Ct discharges through resistors $R_{on}$ and $R_{comp}$ until junction J1 reaches potential $V_{ref}$. This ON time is constant for a given $V_{ref}$ (speed) setting, but becomes somewhat longer as $V_{ref}$ decreases (faster setting). Notably, this ON time is constant for a given setting irrespective of the voltage of the power source.

When Junction J1 reaches $V_{ref}$, comparators 130 and 140 switch their output level. Consequently, capacitor Ct is quickly switched to ground and begins to charge by the back emf of the motor through diode D1 and resistor $R_{feedbk}$. During this time the motor 110 is OFF and the inductive kick of the motor is shorted to a positive potential by freewheeling diode D4. Resistor $R_{feedbk}$ receives the back emf of the motor and charges the capacitor Ct at a rate proportional to the speed of the motor. Notably, $R_{on}$ and $R_{comp}$ are large compared to $R_{feedbk}$ and, therefore, have little effect of the charging rate.

When the capacitor Ct charges up to $V_{ref}$, the cycle repeats. Within this specification, the process described above is termed Pulse Ratio Modulation (PRM), since as the speed setting increases ($V_{ref}$ decreases), ON time gets longer and OFF time gets shorter.

The particular embodiment exemplified in FIG. 1 includes several optional features. These features provide better performance of the inventive speed control circuit and are described hereinbelow.

A notable feature of the embodiment of FIG. 1 is that capacitor Ct is connected to both the ground rail, via resistor $R_{on}$, and the negative rail, via resistor $R_{comp}$, enabling capacitor Ct to charge from both rails during the motor ON time. By adjusting the value of $R_{comp}$ the ON time may thus be made more or less immune to supply voltage changes. Alternatively, the ON time may be adjusted, for example, to decrease slightly as supply voltage decreases, causing the welding wire to feed slightly more slowly as the supply voltage drops.

Another notable feature of the embodiment of FIG. 1 is capacitor C2. Capacitor C2 lessens the tendency of the motor to turn back ON and produce multiple pulses. The larger the capacitance of capacitor C2, the longer the minimum OFF time, hence, lowering the maximum stall current at low speed. The value selected for C2 depends on the performance sought from the particular motor used.

A further notable feature of the embodiment of FIG. 1 is the use of resistors R6 and R9. Resistors R6 and R9 increase the maximum possible speed of the motor. Resistors R6 and R9 operate to "squeeze" the speed range so that the variable resistor 150 controls a more effective range of speeds. Resistors R6 and R9 also prevent oscillation when the speed is set at zero ($V_{ref}$=+). The values of resistors R6 and R9 should also be selected depending on the performance sought from the particular motor used.

Figure 2:
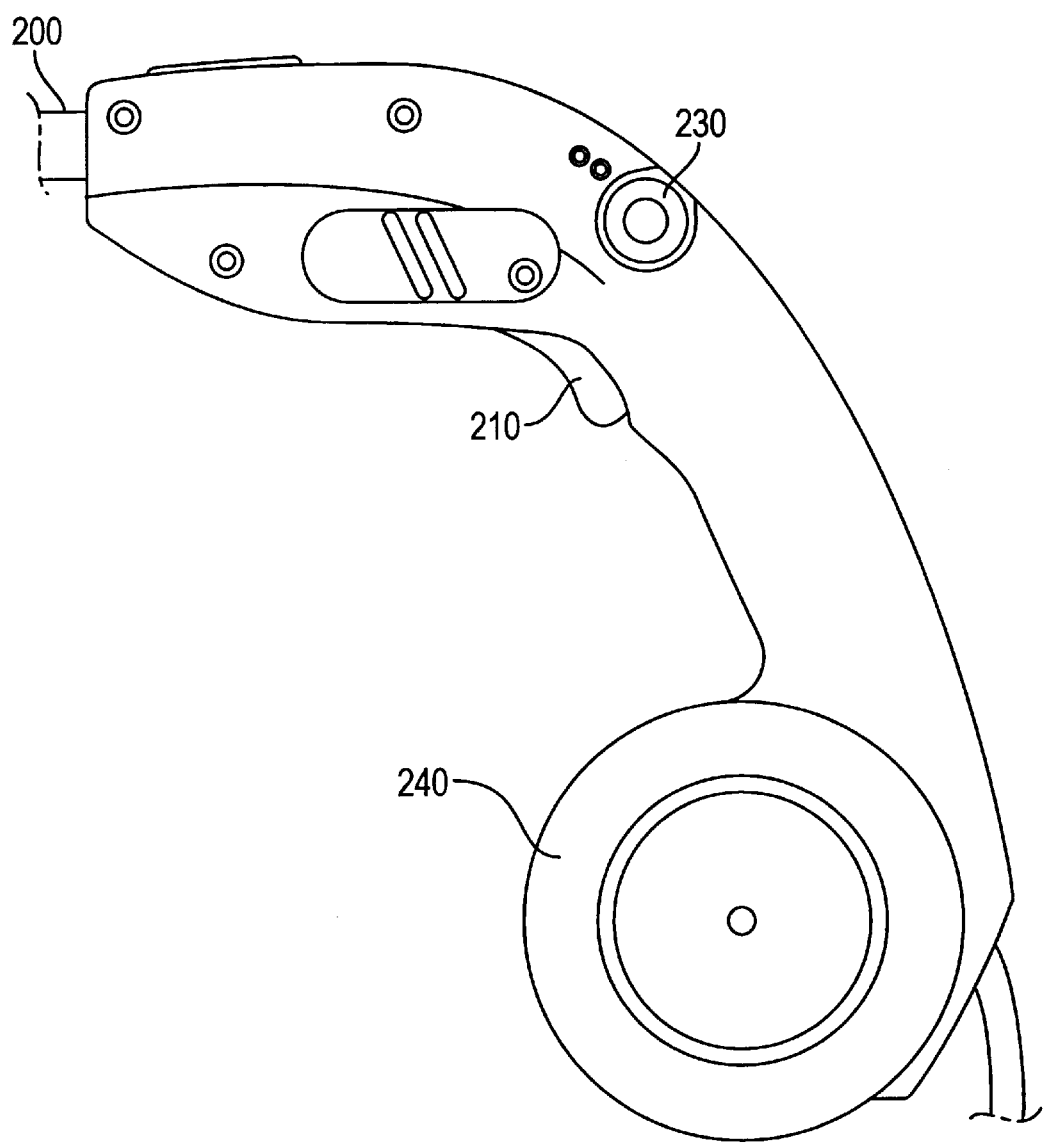
FIG. 2 is a perspective view of a portable MIG welder suitable for use with the present invention.

While the speed control circuit exemplified in the preferred embodiment of FIG. 1 can be used to control electrical motors in various devices, it is particularly suitable for controlling the speed of the electrode feed in a portable MIG welder. The general elements of the handle section of the portable MIG welder according to a preferred embodiment of the invention are shown in FIG. 2. The handle section generally comprises a nozzle 200, a trigger 210, a speed adjustment knob 230, and a wire electrode spool housing 240.

Generally, two potentials are of relevance to a MIG welder, the potential applied to the tip to generate the arc, and the potential applied to the motor deriving the welding wire delivery system. According to an embodiment of the subject invention, the potential applied to the tip is the same potential across the positive rail and the negative rail. This potential, of course, fluctuates depending on the power source used and the amount of current drawn from the battery.

On the other hand, the potential applied to the speed control circuit of the motor is the potential across the positive rail and the ground rail. This potential is kept constant by the Zener diode 115 irrespective of the voltage of the power source. Thus, the speed control circuit maintains constant speed according to the speed set-up.

Figure 3:
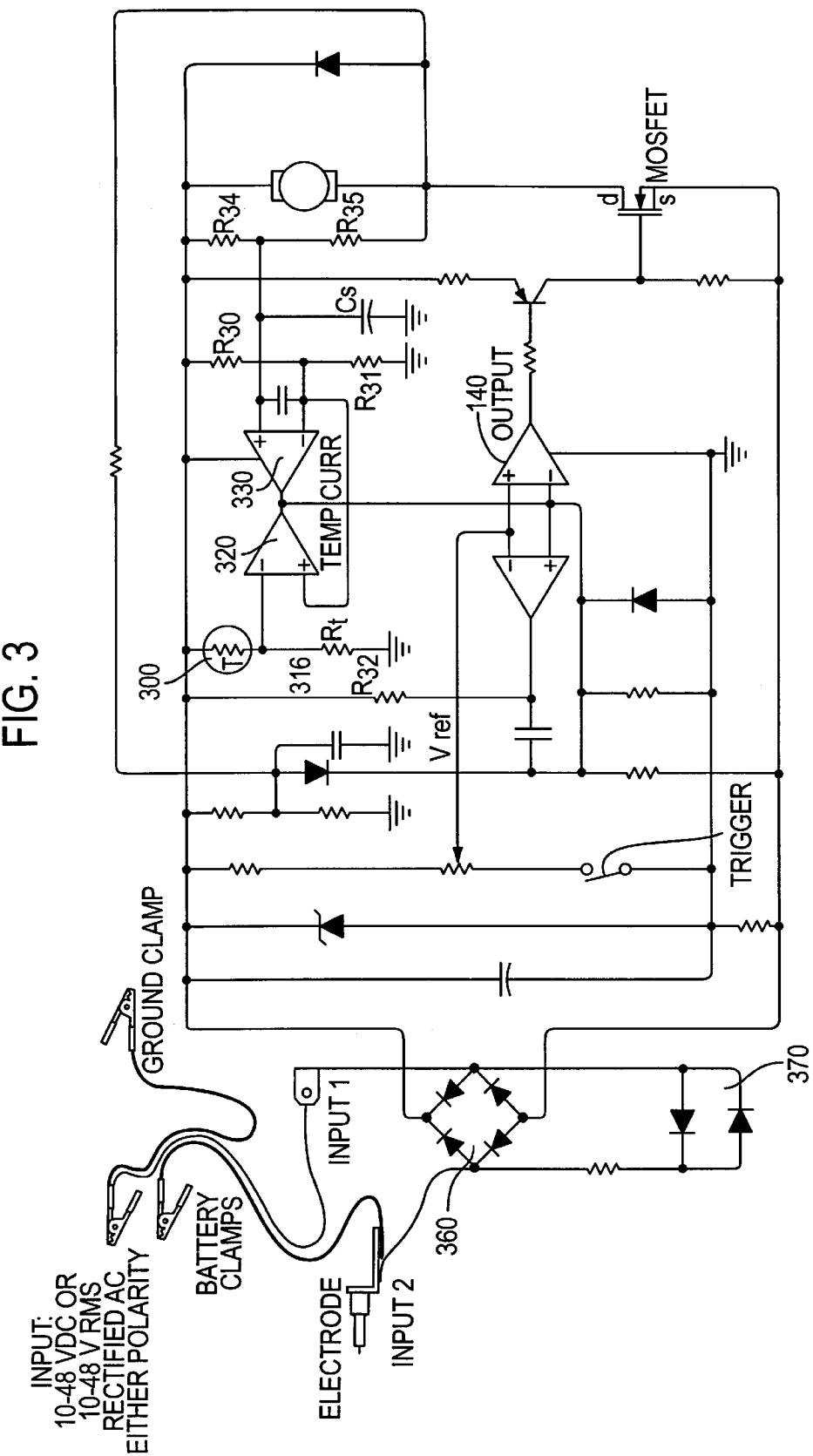
FIG. 3 is an electronic schematic providing further details of the speed control circuit of the preferred embodiment of the present invention.

Further, as shown in FIG. 3, the preferred embodiment includes a diode bridge 360 to protect from inversion of the battery cables. An added feature is the two inverted LEDs which indicate whether the polarity is reversed.

The particular preferred embodiment of FIG. 3 includes an over-current and over temperature protection, which are optional but very beneficial. A voltage divider comprising resistors R30 and R31 provides a reference voltage to the inverted terminal of comparator 330 and the non-inverted terminal of the comparator 320. Comparator 330 is used for the over-current protection, while comparator 320 is used for the over-temperature protection.

For the over-temperature protection, a thermistor 300 is located in a strategic location to enable accurate and timely detection of an over-temperature condition. In the preferred embodiment the thermistor is in contact with both the motor body and an extension of the nozzle. Thus, according to the preferred embodiment the thermistor is capable of detecting over-temperature of both the motor and the nozzle. Alternatively, two thermistors may be used.

The thermistor 300 is connected between the positive rail and the ground rail via resistor R32. The junction between the resistor R32 and the thermistor 300 is connected to the inverting terminal of the comparator 320.

A constant reference voltage for comparators 320 and 330 is established by the voltage divider consisting of R30 and R31. As the temperature of thermistor 200 increases, causing its resistance to decrease, the voltage at the inverting input of comparator 320 rises. When this voltage equals the reference voltage, the output of comparator 320 goes low, discharging Ct and holding the inverting input of comparator 140 low, i.e., holding its output high and therefore holding the motor OFF.

For the over current protection, a voltage divider comprising resistor R34 and R35 is established across the terminals of the motor. The junction between the resistors R34 and R35 is connected to the non-inverting terminal of the comparator 330. A capacitor Cs is provided to smooth the output of this voltage divider. This voltage is proportional to the voltage across the motor. In a manner similar to the over-temperature portion of the circuit described above, when this voltage decreases to a level equal to the reference voltage, comparator 330 will turn the motor OFF. In the particular embodiment of the invention described herein, capacitor Cs is chosen to allow the motor to turn ON in every cycle but to limit its ON time. This limits the voltage across the motor and hence the current drawn, protecting the motor from excessive input voltage and from drawing high current if it stalls.

The MIG welder exemplified by the embodiment of FIG. 2 also incorporates the following features of the present invention.

Because some MIG welding processes require inert shielding gas, conventional welders have a solenoid valve which is opened electrically when the wire begins to feed. Alternatively, some inexpensive welders employ a manual valve which the operator must remember to open and then close when the weld is complete.

To obtain the benefit of automatic operation provided by the solenoid valve while retaining the low cost of a manual valve, the present invention includes a mechanical gas valve adapted to open when the operator begins to depress the trigger, before the wire begins to feed. The valve is located as close to the gas diffuser as possible in order to minimize gas plumbing and consequent potential leaks.

Figure 4:
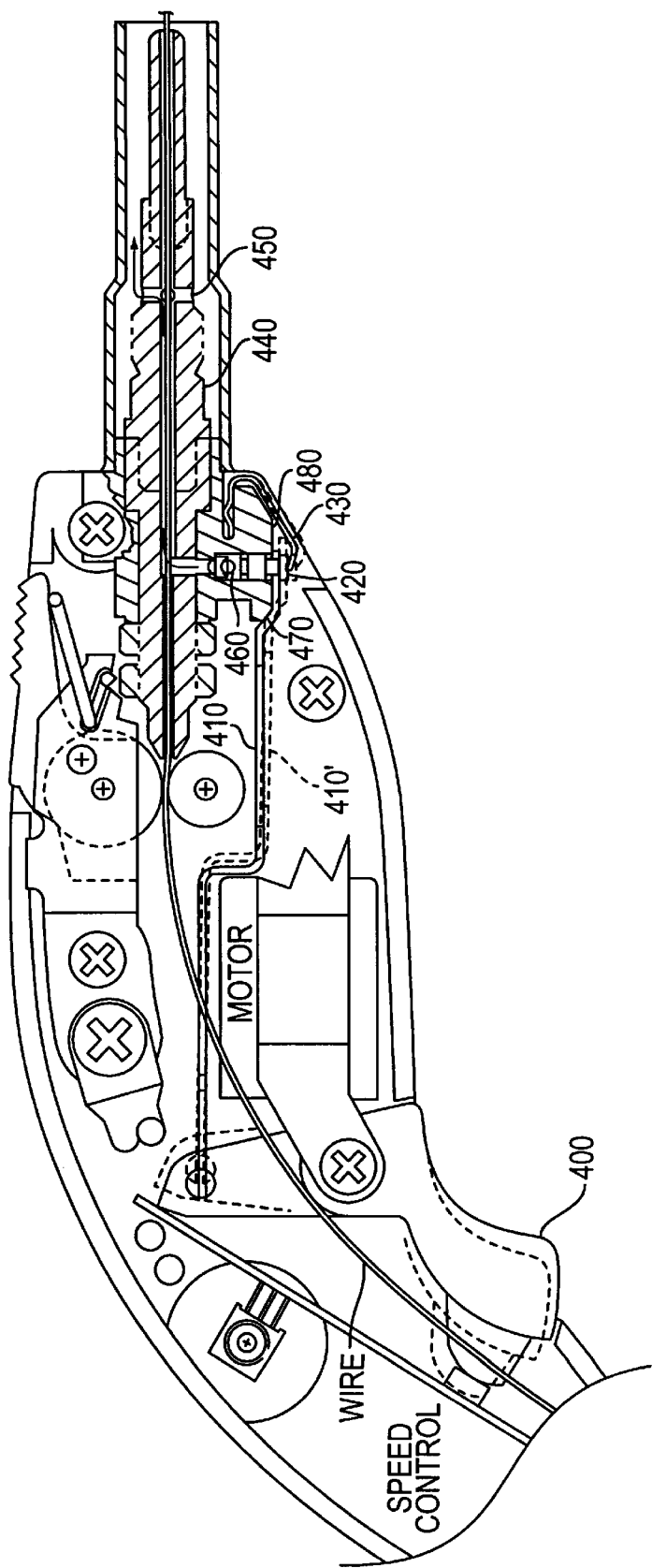
FIG. 4 is a cut-away view of a portable MIG welder suitable for use with the present invention providing further details of the electrode delivery system of an embodiment of the present invention.

In FIG. 4, the trigger 400 operates an electrical contact to initiate feeding of the wire. Link 410 is pivotally connected to trigger 400 and retained at one end by a slot riding in the groove in poppet 420. This poppet is biased upward by hairpin spring 430. Pressurized gas is applied through hole 460 in body 480 which carries conventional gas diffuser assembly 440.

When the trigger is depressed the parts assume the positions shown by the dotted lines. Link 410 is forced downward to position 410' by cam surface 470 on body 480, pulling the poppet open. Gas is now permitted to flow through a passage in gas diffuser assembly 440 into the space concentric with the wire, and out through holes 450 whereupon it surrounds the welding arc. After the valve is open, further motion of the trigger compresses the electrical contact to close a circuit which initiates feeding of the wire.

MIG welders generally employ a pair of spring-loaded pinch rollers to feed the wire. Because the wire may be of a soft material such as aluminum or a harder material such as steel, this spring is usually adjustable to apply pressure suited to the type of wire used. It is also conventional to provide a method of releasing the spring pressure to allow the wire to be threaded between the rollers.

An object of the present invention is to provide adjustable spring loading means by which the spring loader can be easily released for threading while maintaining the objectives of the invention, specifically those of simplicity and low cost.

In FIG. 5, spring 500 is a wireform of suitable spring material. Drive roller 540 is journalled in the housing; idler roller 530 is journalled in pivoting lever 510, which pivots about stub shafts 520. Spring 500 is pivotally anchored in slot 560 in plate 570. Its lower end can be inserted in any of the three slots 550 in plate 570 to adjust the pressure applied between rollers 530 and 540, by lifting its lower portion out of one slot and inserting it into another.

The upper portion of spring 500 bears upon the underside of lever 510 to force roller 530 mounted thereupon against the wire supported in the groove in roller 540.

Threading of the wire between the rollers is accomplished simply by depressing lever 510 to lift roller 530, permitting the wire to be fed between the rollers.

What is claimed is:

1. A speed control circuit for controlling the rotational speed of a direct current (DC) motor to remain constant, said circuit comprising:
    a positive rail connected to a positive polarity side of a power source;
    a ground rail connected directly to electrical ground and to said positive rail through a Zener diode, wherein a first electrical potential remains constant between said positive rail and said ground rail;
    a negative rail connected to a negative polarity side of said power source and further connected to said ground rail through a first resistor, wherein a second electrical potential exists between said negative rail and said positive rail; and
    a DC motor connected between said positive rail and said negative rail through a switching MOSFET, wherein a motor potential across said DC motor remains constant.

2. A speed control circuit as set forth in claim 1 further comprising:
    a first and second comparator, wherein a non-inverting input of said second comparator is connected to an inverting input of said first comparator and a non-inverting input of said first comparator is connected to an inverting input of said second comparator;
    a variable resistor connected to said non-inverting input of said second comparator and said inverting input of said first comparator.

3. A speed control circuit as set forth in claim 2 further comprising;
    a switch between said variable resistor and said ground rail whereby when said switch is closed a reference voltage at said non-inverting input of said second comparator and said inverting input of said first comparator drops below said first electrical potential causing a first high level at an output of said first comparator and a low level at an output of said second comparator wherein said low level at an output of said second comparator is converted to a second high level by said inverter circuit wherein said second high level turns on said MOSFET and said MOSFET thus, turns on said motor.

4. A speed control circuit as set forth in claim 3 further comprising;
    a first capacitor connected to an output of said first comparator on one side;
    a first diode connected to said first capacitor, wherein a cathode of said first diode is connected to a side of said first capacitor which is not connected to said output of said first comparator and an anode of said first diode is connected to said DC motor through a feedback resistor;
    a fourth resistor connected at one side to said cathode of said first diode and to said inverting input of said second comparator and connected at an opposite side to said ground rail; and
    a fifth resistor connected at one side to said inverting input of said second comparator and connected at an opposite side to said negative rail.

5. A speed control circuit as set forth in claim 4 further comprising;
    a second capacitor connected between said anode of said first diode and said ground rail;
    an oscillation resistor in parallel with said second capacitor;
    a sixth resistor between said anode of said first diode and said positive rail;
    a gate resistor connected between said gate of said MOSFET and said negative rail;
    a motor diode in parallel with said DC motor;
    a comparator diode in parallel with said fourth resistor;
    a pullup resistor between said output of said first comparator and said positive rail; and
    a seventh resistor between said variable resistor and said positive rail.

6. A speed control circuit as set forth in claim 5 further comprising;
    an over-current circuit for detecting a condition wherein said speed control circuit is drawing more than a given amount of current; and
    an over-temp circuit for detecting a condition wherein a circuit temperature of said speed control circuit is greater than a given temperature.

7. A speed control circuit as set forth in claim 2, wherein said inverter circuit comprises;
    a second and third resistor; and
    a transistor, wherein said second resistor is connected between a gate of said transistor and an output of said second comparator, and said third resistor is connected between an emitter of said transistor and said positive rail, and a collector of said transistor is connected to said gate of said MOSFET.

8. A speed control circuit as set forth in claim 1 further comprising;
    a diode bridge for protecting against a reversal of said positive and said negative rails.

9. A speed control circuit as set forth in claim 1 wherein said DC motor is operatively connected to a portable MIG welder and supplies power to said portable MIG welder.

10. A speed control circuit as set forth in claim 9, wherein said wire feed device comprises;
    a drive roller for guiding a wire from a wire spool;
    a tension spring for asserting pressure on said drive roller, wherein said tension spring is independently adjustable to accommodate different sizes, hardnesses and friction properties of said wire.

11. A speed control circuit as set forth in claim 1 wherein said DC motor is operatively connected to a portable MIG welder and supplies power to a wire feed device on said portable MIG welder.

12. A speed control circuit as set forth in claim 11, wherein a switch further causes a gas valve of said portable MIG welder to open prior to engaging said wire feed device.

13. A speed control circuit for a portable, hand-held MIG welder comprising:
    a Zener diode connected between a positive rail and a ground rail, wherein said positive rail is further connected to a positive polarity side of a power source;
    a DC motor connected between said positive rail and a negative rail for supplying a constant power to a wire drive device, wherein said constant power is not effected by variations in a voltage supplied to said speed control circuit from a power supply; and
    a trigger for initiating a delivery of said constant power to said wire drive device and said trigger concurrently initiates an opening of a gas valve, wherein said opening occurs slightly before said delivery.

* * * * *